(12) United States Patent
Gazier et al.

(10) Patent No.: US 8,355,333 B2
(45) Date of Patent: *Jan. 15, 2013

(54) METHODS AND SYSTEMS FOR SESSION INITIATION PROTOCOL CONTROL OF NETWORK EQUIPMENT

(75) Inventors: Michael A. Gazier, Ottawa (CA); Lyndon Ong, Sunnyvale, CA (US); Ian H. Duncan, Ottawa (CA)

(73) Assignee: Ciena Corporation, Hanover, MD (US)

( * ) Notice: Subject to any disclaimer, the term of this patent is extended or adjusted under 35 U.S.C. 154(b) by 637 days.

This patent is subject to a terminal disclaimer.

(21) Appl. No.: 11/513,606

(22) Filed: Aug. 31, 2006

(65) Prior Publication Data

US 2008/0056151 A1 Mar. 6, 2008

(51) Int. Cl.
*H04J 1/16* (2006.01)
(52) U.S. Cl. ....................................................... 370/252
(58) Field of Classification Search .................. 370/351, 370/352, 254, 395.21, 466, 225, 252; 455/412.1; 709/202
See application file for complete search history.

(56) References Cited

U.S. PATENT DOCUMENTS

| | | | | |
|---|---|---|---|---|
| 2002/0103850 A1* | 8/2002 | Moyer et al. | .................. | 709/202 |
| 2003/0117951 A1* | 6/2003 | Wiebe et al. | .................. | 370/225 |
| 2003/0118028 A1* | 6/2003 | Neal et al. | ................ | 370/395.21 |
| 2004/0246989 A1* | 12/2004 | Brolin | ........................... | 370/466 |
| 2006/0029033 A1* | 2/2006 | Lee | ................ | 370/351 |
| 2006/0068762 A1* | 3/2006 | Baldwin et al. | ............ | 455/412.1 |
| 2006/0072542 A1* | 4/2006 | Sinnreich et al. | ............ | 370/351 |
| 2006/0165064 A1* | 7/2006 | Brown et al. | ................. | 370/352 |
| 2006/0221859 A1* | 10/2006 | Bijwaard et al. | .............. | 370/254 |

\* cited by examiner

*Primary Examiner* — Mark Rinehart
*Assistant Examiner* — Gbemileke Onamuti
(74) *Attorney, Agent, or Firm* — Clements Bernard PLLC; Christopher L. Bernard; Lawrence A. Baratta, Jr.

(57) ABSTRACT

A network method utilizing Session Initiation Protocol to establish a network path between network elements in a network includes generating a request for a network service in Session Initiation Protocol, wherein the request is one of manually and automatically configured, and wherein the request is directed to the network; obtaining network resources responsive to the request, wherein the network resources comprise network parameters required to obtain and provision the network path; and configuring the network resources responsive to the request. The network includes a plurality of network elements operable to receive Session Initiation Protocol requests. Optionally, the plurality of network elements include a plurality of optical network elements, wherein the network route includes wavelengths between a first and second optical network element in the network. The network parameters include one or more of available wavelengths, available bandwidth, available regeneration points, available circuits, intermediate network elements, and combinations thereof.

21 Claims, 11 Drawing Sheets

METHODS AND SYSTEMS FOR SESSION INITIATION PROTOCOL CONTROL OF NETWORK EQUIPMENT

FIELD OF THE INVENTION

The present invention relates generally to methods and systems for controlling a network, including, but not limited to, an optical network. More specifically, the present invention relates to Session Initiation Protocol (SIP)-based methods and systems for controlling a network, including, but not limited to, an optical network. In particular, SIP is used to set up resources and/or services across the network.

BACKGROUND OF THE INVENTION

Traditionally, a network is controlled at each of the Open Systems Interconnection (OSI) layers. The OSI model is a logical structure for network operations standardized by the International Standards Organization (ISO). The OSI model organizes the communications process into seven different categories and places the categories into a layered sequence based upon their relationships to other processes. Layers seven through four deal with end-to-end communications between a message source and a message destination, while layers three through one deal with network access. The layers communicate with their peers in the network. For example, at layer 0, optics can be populated with specific wavelengths. In some automated systems, optics can be programmed with certain characteristics, such as wavelengths, filters, and optical switching capabilities at the optical layer. Typically, these are all controlled by an Element Management System (EMS), Network Management System (NMS), or Operations Support System (OSS). For example, at layer 1, the network is typically based on a Synchronous Optical Network/Synchronous Digital Hierarchy (SONET/SDH) standard, offering virtual Time Division Multiplexing (TDM) and data channels within the bit streams. The channels are built, switched, or dismantled at nodes. Again, this is typically controlled by the EMS, NMS, or OSS, although, more recently, layer-specific resource control protocols, such as Resource Reservation Protocol (RSVP), have been defined to control the network (reference Generalized Multi-Protocol Label Switching (GMPLS)). For example, at layer 2, a common protocol is Ethernet. Ethernet networks can be provisioned as in Provider Backbone Transport (PBT) networks (http://www.ieee802.org/1/files/public/docs2005/ah-bottorff-pbt-for-iee-v41-0905.pdf or http://www.ietf.org/internet-drafts/draft-allan-pw-o-pbt-00.txt). However, Ethernet networks typically provision simply by using the broadcast mechanism that is inherent in Ethernet. Optimizations have been added to extend reach and efficiency, such as bridges and multi-link bonding, which has added to the complexity of the protocols used, without changing the basic principles. For example, at layer 3, the Internet Protocol (IP) layer, IP routing is used to interconnect nodes in a network. Typically, these nodes all run routing protocols, such as Routing Information Protocol (RIP), Open Shortest Path First (OSPF) protocol, etc. Modern networks often apply key mechanisms, such as Multi-Protocol Label Switching (MPLS), at this layer in order to enhance the scalability of, add features to, or increase the stability of the networks. For example, at layer 4, data transport reliability, service ports, and the like are addressed. For example, at layer 5, the session layer, SIP can be used to initiate sessions. A session is a communication of some form between two peer entities. A relevant example is the initiation of a voice call from a wireless (WiFi)-enabled Personal Digital Assistant (PDA). The WiFi-enabled PDA generates the voice call to another user in a form such as "INVITE name@yourisp.com" using SIP. SIP agents track "name" and are aware of many items, such as, but not limited to, the location of "name" (e.g. "name" is now in "city"), the presence/availability of "name" (e.g. "name" can only be contacted by "family" at this time), and the media of "name" (e.g. "name" has set up the network to forward voice calls to a home voicemail at this time).

Current efforts to define protocols for optical networking have focused on layer-specific controls. Disadvantageously, layer-specific controls require accessing each layer to set up resources and/or services across the network. For example, for layer 0, protocol definition has focused on the specification of the wavelength to be used for a connection, the level of optical impairments that are allowed in the connection, and the source and destination within the optical network. Additionally, for layer 1, protocol definition has focused on the specification of the timeslot to be used for a connection within a TDM signal, the type of links to be used in the sense of any automated protection functionality associated with the links, etc. This work has been defined in the Internet Engineering Task Force (IETF) standards, such as Request for Comments (RFC) 3471, the GMPLS signaling functional description; RFC 3473, the GMPLS signaling extensions to RSVP; and RFC 3946, the GMPLS extensions for SONET/SDH control.

User Controlled Light Paths (UCLP) is a distributed network control application developed to support the sharing of network facilities amongst a community of users. This sharing is achieved by providing a software object model of the explicit set of available resources comprising the physical network segments and cross-connect equipment, with supported methods for provisioning and control of these resources. The users of the application interact with these UCLP objects to concatenate segments and cross-connects and assemble path objects that model services in the network. UCLP is disadvantageous in similar ways to other layer-specific signaling for network control. This mode of directly and explicitly manipulating models of the physical equipment and facilities to create service-desired topologies has limitations, as it necessarily exposes details of the underlying network infrastructure. Understanding and correctly interacting with these details can be a burden to users simply seeking service. Revealing network design and operational state at this level of detail is commercially undesirable for many service providers. UCLP is built on a web services framework provided by the Extensible Markup Language (XML)-based Simple Object Access Protocol (SOAP). The UCLP application interacts with the various existing configuration control interfaces (typically TL1 or SNMP) of the underlying physical network elements to establish services.

What has not been fully explored, however, is the area of technology-independent control that is required to offer services over a particular layer network. This is termed "call control" in the related standards (especially Automatically Switched Optical Network (ASON) or International Telecommunications Union (ITU-T) Recommendation G.8080 and is currently embodied in protocols only as a common identifier that links together signaling for multiple connections, or as a connection-independent control plane flow for purposes such as pre-connection compatibility verification. The former is described in ITU-T Recommendation G.7713.2, the specification for Distributed Call/Connection Management Using GMPLS RSVP-TE, while the latter is described in IETF draft "draft-ietf-ccamp-gmpls-rsvp-te-call-00.txt," a work in progress.

BRIEF SUMMARY OF THE INVENTION

Typically, paths in a network are set up via direct provisioning performed by an EMS/NMS/OSS, i.e. a platform supporting multiple Wavelength Division Multiplexed (WDM) spans in order to provide Network Management (NM) services. The EMS/NMS/OSS is a system responsible for managing at least part of the network, and communicating with agents in order to help keep track of network resources, statistics, and performance. Alternatively, paths in the network are set up via automated nodal software that is capable of performing routing under EMS/NMS/OSS command. A relatively recent protocol, SIP, has evolved for use in conjunction with multimedia devices in order to locate and connect devices together. For example, a Voice-over-Internet Protocol (VoIP) voice call between IP telephones or computers uses SIP to locate and connect the parties calling/called. The present invention alters the fundamental assumption that SIP is used to trigger network connections between devices, and offers a new idea that SIP can be used to tie together network equipment in a plurality of settings, such as telecommunications, cable, enterprise, wireless, etc., across different transport network technologies, including optical, wireless, TDM, and packet.

In one exemplary embodiment of the present invention, a network method utilizing Session Initiation Protocol to establish a network path between network elements in a network includes generating a request for a network service in Session Initiation Protocol, wherein the request is one of manually and automatically configured, and wherein the request is directed to the network; obtaining network resources responsive to the request, wherein the network resources comprise network parameters required to obtain and provision the network path; and configuring the network resources responsive to the request. The network includes a plurality of network elements operable to receive Session Initiation Protocol requests. Optionally, the plurality of network elements include a plurality of optical network elements, wherein the network route includes wavelengths between a first and second optical network element in the network. The network parameters include one or more of available wavelengths, available bandwidth, available regeneration points, available circuits, intermediate network elements, and combinations thereof.

In another exemplary embodiment of the present invention, a network utilizing Session Initiation Protocol to establish network paths between network elements in the network includes a plurality of network elements operable to receive Session Initiation Protocol requests and a Session Initiation Protocol server connected to one or more of the plurality of network elements; wherein the Session Initiation Protocol requests comprise requests for network resources to establish a network path between two network elements; and wherein the network is operable to configure network resources responsive to the Session Initiation Protocol requests. Optionally, the network comprises an optical dense wavelength division multiplexed network.

In a further exemplary embodiment of the present invention, a network utilizing Session Initiation Protocol to control network resources includes a Session Initiation Protocol application and one or more nodes, wherein the one or more nodes are connected to the application; wherein the application is operable to generate network requests for network resources in Session Initiation Protocol; and wherein the network is operable to control network resources responsive to the network requests. Optionally, the network request is for bandwidth on the network. The network request is directed to the one or more nodes connected to the application. Optionally, the network request comprises a plurality of parameters, wherein the plurality of parameters comprise multiple Open Systems Interconnection layer parameters operable to control network resources.

In a still further exemplary embodiment of the present invention, a network utilizing Session Initiation Protocol to control multiple Open Systems Interconnection layer resources in order to eliminate dependencies on the network being homogeneous includes a Session Initiation Protocol application, wherein the application resides on a database, and one or more nodes with multiple Open Systems Interconnection layer resources, wherein the one or more nodes are connected to the database; wherein the application is operable to generate network requests in Session Initiation Protocol for network resources across multiple Open Systems Interconnection layers, wherein the network requests are operable to be received at any one of the multiple Open Systems Interconnection layers for network resources at any one of the multiple Open Systems Interconnection layers; and wherein the network is operable to control and switch network resources across the multiple Open Systems Interconnection layers responsive to the network requests.

In a still further exemplary embodiment of the present invention, a network utilizing Session Initiation Protocol and Internet Protocol Multimedia Subsystem to control network resources in order to eliminate dependencies on the network being homogeneous includes a Home Subscriber Server operable to handle Session Initiation Protocol calls/sessions, wherein the Home Subscriber Server is a database; Session Initiation Protocol servers or proxies, collectively referred to as the Call Session Control Function, used to process Session Initiation Protocol signaling packets in the Internet Protocol Multimedia Subsystem, wherein the Session Initiation Protocol servers or proxies are connected to the Home Subscriber Server; and one or more nodes, wherein the one or more nodes are connected to the Session Initiation Protocol servers or proxies; wherein the one or more nodes are operable to register with the Home Subscriber Server; wherein the Session Initiation Protocol servers or proxies are operable to generate network requests in Session Initiation Protocol for network resources and the network requests are authenticated by the Home Subscriber Server; and wherein the network is operable to control network resources responsive to the network requests. Optionally, the network comprises multiple Open Systems Interconnection layers, and wherein the network request is operable to be received at an Open System Interconnection layer for requesting network resources at any of the Open System Interconnection layers. Alternatively, the Home Subscriber Server comprises user profiles, authentication and authorization information, and physical network information.

BRIEF DESCRIPTION OF THE DRAWINGS

The present invention is illustrated and described herein with reference to the various drawings, in which like reference numbers denote like system components and/or method steps, as appropriate, and in which.

DETAILED DESCRIPTION OF THE INVENTION

Typically, paths in a network are set up via direct provisioning performed by an EMS/NMS/OSS, i.e. a platform supporting multiple WDM spans in order to provide NM services. The EMS/NMS/OSS is a system responsible for managing at least part of the network, and communicating with agents in order to help keep track of network resources, statistics, and performance. Alternatively, paths in the network are set up via automated nodal software such as RSVP-TE that is capable of performing routing under EMS/NMS/OSS command. A relatively recent protocol, SIP, has evolved for use in conjunction with multimedia devices in order to locate and connect devices together. For example, a VoIP voice call between IP telephones or computers uses SIP to locate and connect the parties calling/called. The present invention alters the fundamental assumption that SIP is used to trigger network connections between devices, and offers a new idea that SIP can be used to tie together network equipment in a plurality of settings, such as telecommunications, cable, enterprise, wireless, etc., across different transport network technologies, including optical, TDM, and packet.

SIP is a protocol developed by the IETF MMUSIC Working Group. It is also a proposed standard for initiating, modifying, and terminating an interactive user session. This interactive user session typically involves multimedia elements, such as voice, video, instant messaging (IM), online gaming, virtual reality, etc. SIP has been accepted as a 3GPP signaling protocol, as well as a permanent element of the IP Multimedia Subsystem (IMS) architecture. As described above, it is one of the leading signaling protocols for VoIP, along with H.323.

Figure 1:
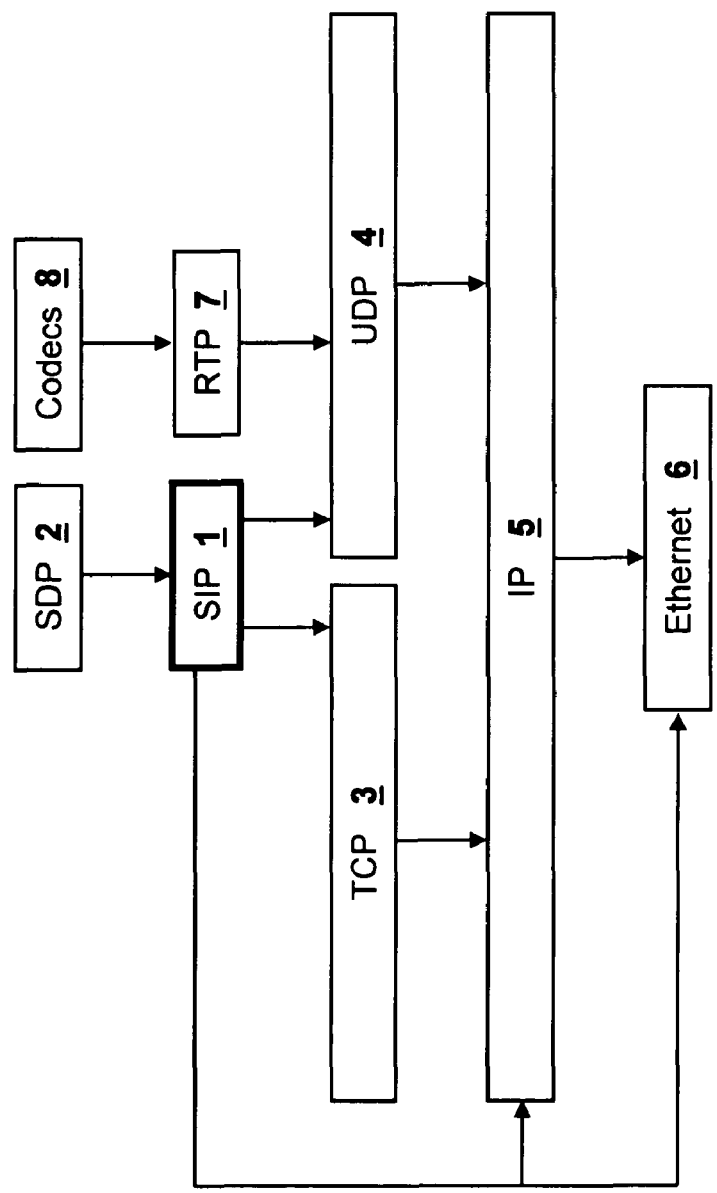
FIG. 1 is a block diagram illustrating SIP and its relationship to Transmission Control Protocol (TCP), User Datagram Protocol (UDP), and other OSI layers.

Referring to FIG. 1, SIP 1 typically uses TCP 3 and UDP 4 port 5060 in order to connect to SIP servers and other SIP endpoints. The primary use of SIP 1 is the setting up and tearing down of voice and video calls, i.e. in any application where session initiation is a requirement, such as event subscription and notification, terminal mobility, etc. All voice/video communications through codecs 8 normally takes place via Real-Time Transport Protocol (RTP) 7. TCP 3 and UDP 4 operate on an IP 5 network such as Ethernet 6. Alternatively, SIP 1 can be implemented directly over IP 5 or Ethernet 6, or over any other layer.

Figure 2:
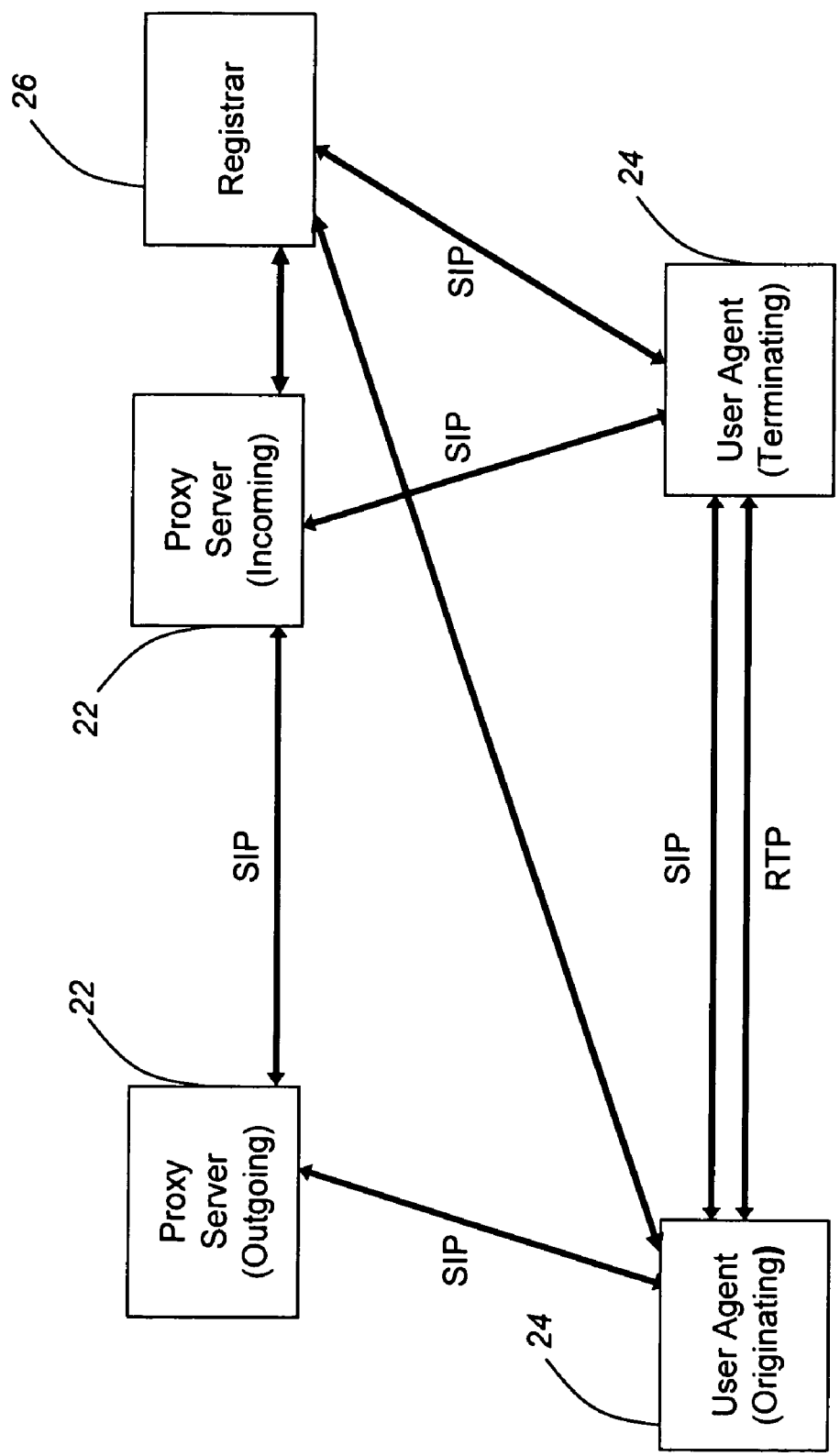
FIG. 2 is a block diagram illustrating SIP connections between User Agents and Proxy Servers.

Referring to FIG. 2, SIP provides a signaling and setup protocol for IP-based communications that supports a superset of the call processing functions and features of the Public Switched Telephone Network (PSTN). It focuses on call signaling and setup. It has been designed to enable the building of these features in network elements known as Proxy Servers 22 and User Agent Servers 24. The features provide familiar telephone-like operations, such as dialing, ringing, busy signals, etc. Proxy Servers 22 route requests to a user's current location(s), authenticate and authorize users for services, implement provider call routing policies, and provide features to users. SIP also utilizes a registration function that allows user agents to upload their current locations for use by the Proxy Servers 22. A User Agent Server 24 that handles a REGISTER is referred to as a Registrar 26.

A standard IM protocol that is based on SIP is SIMPLE, which, among other things, carries presence information that conveys a party's willingness and ability to engage in communications. Efforts have also been made to integrate SIP-based VoIP with the Extensible Messaging and Presence Protocol (XMPP) specification. In general, SIP's peer-to-peer nature does not enable network-provided services, such as the legal interception of calls, the routing of emergency calls, etc. It is also difficult to identify the proper Public Service Answering Point (PSAP) due to the inherent mobility of IP endpoints and the lack of any network location capability. However, solutions to these problems are forthcoming. Standards being developed by 3GPP and 3GPP2 define applications of the basic SIP model that facilitate commercialization and enable support for network-centric capabilities.

Thus, SIP is a protocol that provides a multi-entity transaction state machine that establishes sessions. It is agnostic regarding the nature and function of the session, carrying an encapsulated payload between clients, typically with a Session Description Protocol (SDP) that provides the specifics of session functionality, including, but not limited to, coding mechanisms and configuration/addressing information. The majority of SIP deployments are VoIP-related, such as in Private Branch Exchange (PBX) or IM applications, and originate from users' handsets or computers, being targeted to a peer handset or computer. However, SIP payload is, in effect, open and can be extended to support applications of need, such as to connect to and within a network itself.

For example, the requestor of a network resource using SIP can itself be a network element. The request can be in the form "INVITE node71A42@mynetwork.com," or a more general "INVITE mynetwork@mynetwork.com," using SIP with associated payload describing applicable network resource requirements and proper authentication mechanisms that are integral to the process. In these forms, there are both fixed and loose targets being requested, allowing for different network reactions and the ability to add another layer of abstraction in order to allow services, such as "anycast" services, where the network has a choice of service destinations.

SDP is a format for describing streaming media initialization parameters and has been published by the IETF as RFC 2327. SDP describes multimedia sessions for the purposes of session announcement, session invitation, and other forms of multimedia session initiation. SDP is a container for messages that can describe what is requested. This can be a description of what resources are desired, what capabilities a requestor has, etc. The SDP syntax is intended to support the addition of key:value codes to support extension of a functional application. Further, there are opportunities to augment or replace SDP in the SIP message in order to define preferred or mandatory resource request parameters with XML. With some modification to the coding, UCLP can be directly encapsulated. Alternatively, it can be translated into an XML or conventional SDP syntactic format.

The content of a SIP message can be modified with no modification to the SIP protocol, and can be compatible with network devices such as those in IMS, described below. For example, the SIP message can be modified to contain information similar to the UCLP, and thus obtain similar capabilities. However, by changing the vehicle to SIP, an entirely different set of network capabilities and benefits, as well as architectures, are obtained.

In general, SIP uses a specific message format that is defined in RFC 3261. Equivalently, the semantics of SIP can be embodied in another protocol that performs the same set of functions for controlling a network, but is carried in self-describing messages that are capable of being parsed.

XML can be used in several ways as a compliment to the SIP/SDP methodologies described above, achieving the same or similar results. There is equivalence between SIP+SDP, SIP+SDP+XML, and SIP+XML (where "+" is used to indicate that the item to the right is contained in the item to the left). In other words, SIP can be the base container.

In general, XML is a W3C-recommended general purpose markup language that is used to create special purpose markup languages, capable of describing a plurality of different kinds of data. XML describes data and contains the data as well, in a database. It is a subset of Standard Generalized Markup Language (SGML), and its primary purpose is to facilitate the sharing of data across different systems, including those connected to the Internet. Languages that are based on XML include Geography Markup Language (GML), Resource Definition Framework (RDF)/XML, Rich Site Summary (RSS), Atom, MathML, Extensible HyperText Markup Language (HTML), Scalable Vector Graphics (SVG), MusicXML, etc. These languages can be modified and validated by programs without prior knowledge of their form.

XML provides a text-based means to describe and apply a tree-based structure to information. All of the information manifests as text, interspersed with markup that separates the information into a hierarchy of character data, container elements, and attributes of those container elements. Data structures are expressed in a formal, relatively simple manner. An XML schema is a description of a type of XML document, expressed in terms of constraints on the structure and content of documents of that type, in addition to the constraints imposed by XML itself. A plurality of standard and proprietary XML schema languages have emerged for the purpose of formally expressing such schemas, and some of these XML schema languages are themselves XML-based.

XML extensions include: XPath—provides random access to XML data for other technologies, including Extensible StyleSheet Language Transformation (XSLT), Extensible StyleSheet Language Format (XSL-FO), XQuery, etc., and refers to all or part of the text, data, and values in XML elements, attributes, processing instructions, comments, etc.; XQuery—analogous to Structured Query Language (SQL) for relational databases; XML Namespaces—enables the same document to contain XML elements and attributes taken from different vocabularies without naming collisions occurring; XML Signature—defines the syntax and processing rules for creating digital signatures on XML content; XML Encryption—defines the syntax and processing rules for encrypting XML content; and XPointer—is a system for addressing components of XML-based Internet media.

In summary, XML is a meta-container language that is used for binding semantics onto data, enabling information portability (reference also "s-expression"). It is used to exchange information in a structured manner, allowing devices or applications to later retrieve or modify the data in an efficient manner.

IMS is a standardized Next Generation Networking (NGN) architecture for telecommunications operators that provides fixed and mobile multimedia services. It uses a VoIP implementation based on a 3GPP-standardized implementation of SIP, and runs over the standardized IP. Existing packet-switched and circuit-switched telephone systems are supported. IMS provides all existing and new services that the Internet provides. IMS uses open standard IP protocols, as defined by the IETF. Thus, a multimedia session between two IMS users, between an IMS user and a user on the Internet, or between two users on the Internet is established using exactly the same protocol. The interfaces for service developers are also based on IP protocols. IMS uses cellular technologies in order to provide access and Internet technologies in order to provide services. Services with SIP are generally, but not exclusively, tied into IMS.

The Home Subscriber Server (HSS) is the master user database that supports IMS network entities that are handling calls/sessions. It contains subscription-related information, such as user profiles, performs authentication and authorization of a user, and provides physical information about the location of the user.

SIP servers or proxies, collectively referred to as the Call Session Control Function (CSCF), are used to process SIP signaling packets in the IMS. A Proxy-CSCF (P-CSCF) is a SIP proxy that is the initial point of contact for the IMS terminal, and is located in the visited network (if the visited network is IMS compliant) or in the home network (if the visited network is not IMS compliant). A Session Border Controller (SBC) can also be used for this function. The IMS terminal discovers its P-CSCF with Dynamic Host Configuration Protocol (DHCP), or its assignment in the Packet Data Protocol (PDP) context (for General Packet Radio Service (GPRS)). The P-CSCF is assigned to an IMS terminal during registration. This assignment lasts for the duration of the registration. The P-CSCF resides on the path of all signaling messages and can inspect all signaling messages. The P-CSCF authenticates users and establishes an IPSec security association with the IMS terminal. The P-CSCF compresses and decompresses SIP messages using SigComp, reducing the roundtrip over slow radio links. The P-CSCF can include a Policy Decision Function (PDF) that authorizes media plane resources, such as Quality of Service (QoS) over the media plane. It is used for policy control, bandwidth management, etc. Finally, the P-CSCF generates charging records. An Interrogating-CSCF (I-CSCF) is a SIP proxy that is located at the edge of an administrative domain. Its IP address is published in the Domain Name System (DNS) of the domain such that remote servers (e.g., a P-CSCF in a visited domain or a S-CSCF in a foreign domain) can find it and use it as an entry point for all SIP packets to the domain. The I-CSCF queries the HSS using the DIAMETER Cx and Dx interfaces in order to retrieve the user location and to route the SIP request to its assigned Serving-CSCF (S-CSCF). A S-CSCF is the central node of the signaling plane. It is an SIP server that performs session control, and is located in the home network. The S-CSCF uses DIAMETER Cx and Dx interfaces in order to download and upload user profiles, having no local storage related to the user. The S-CSCF handles SIP registrations, allowing it to bind the user location and SIP address, resides on the path of all signaling messages and can inspect all signaling messages, decides which application server(s) the SIP message is forwarded to in order to provide services, provides routing services, and enforces the policies of the network operator.

In summary, IMS is an architecture that relies on devices registering into controllers and on SIP to request services between user terminals. The methods and systems of the present invention are strongly compatible with IMS and represent an optimal way to work in an IMS infrastructure by using SIP protocols to control networks that are themselves controlled by IMS.

Figure 3A:
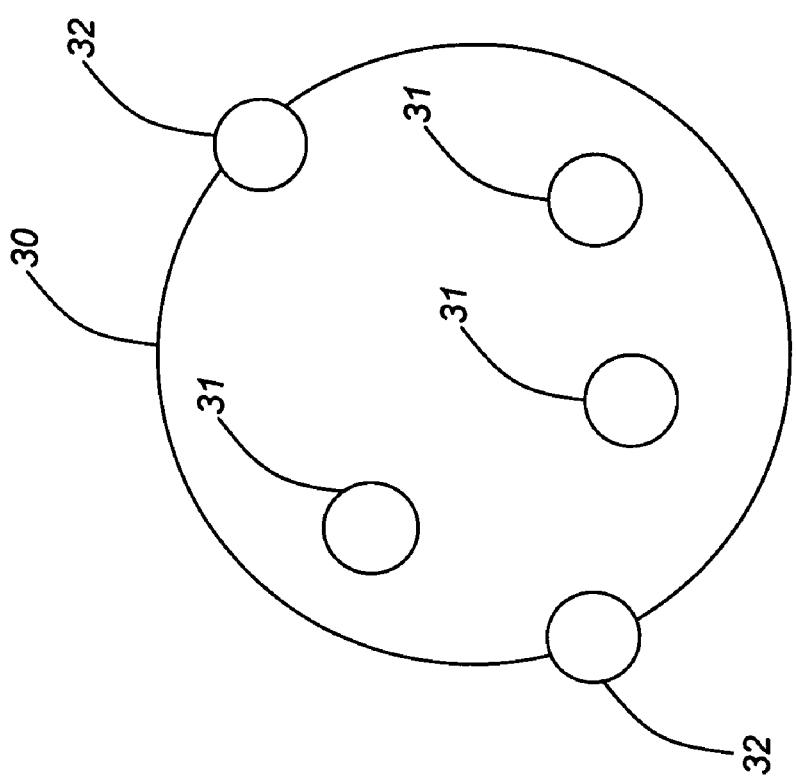
FIGS. 3a-3c are block diagrams illustrating a telecommunications network in varying exemplary embodiments of the present invention.
Figure 3B:
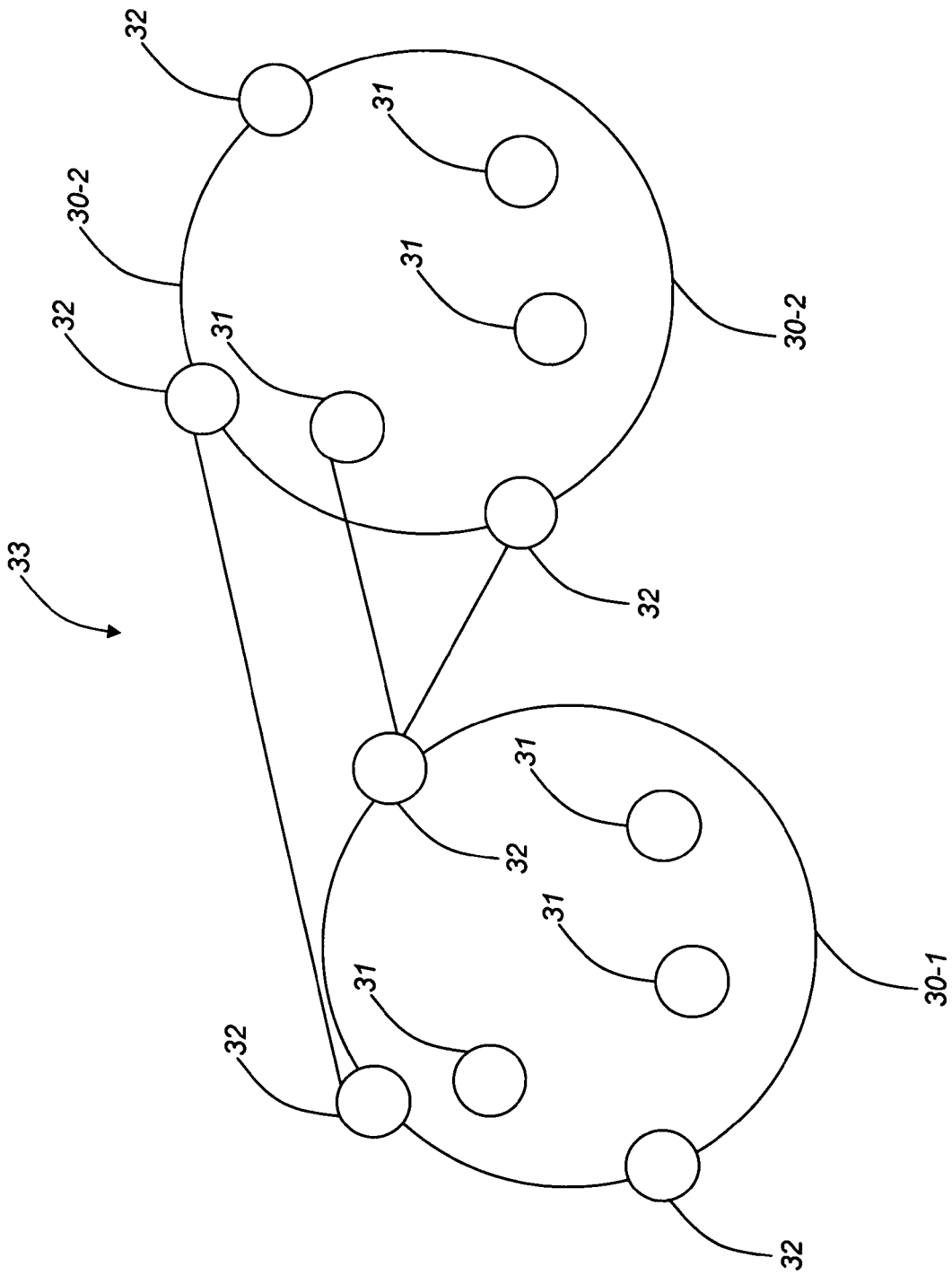
Figure 3C:
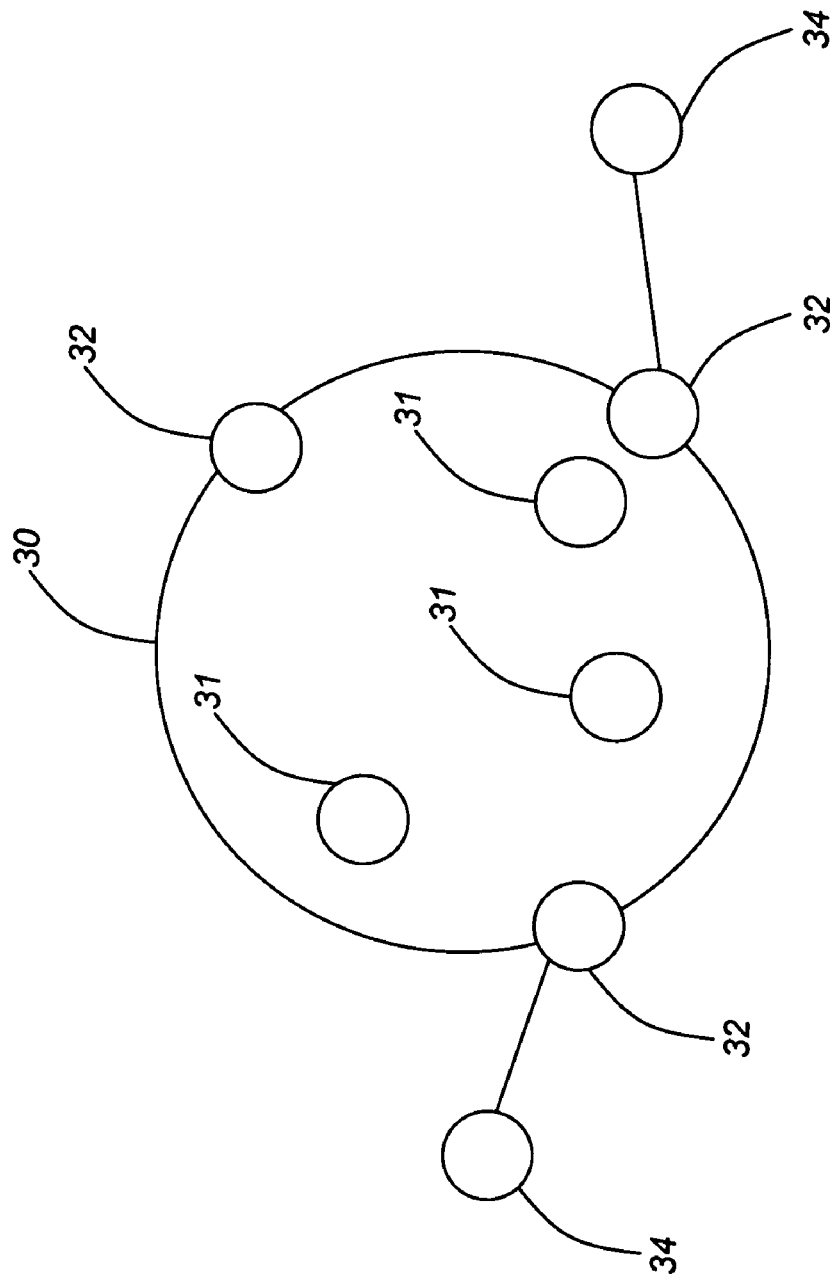

The present invention also provides a new class of device that blends computer applications, hosts, or features with networking equipment. FIGS. 3a-3c illustrate a telecommunications network 30, in varying exemplary embodiments of the present invention. FIG. 3a illustrates a network 30 with core nodes 31 and edge nodes 32. FIG. 3b illustrates that two networks 30-1, 30-2, such as depicted in FIG. 3a, interconnect to form a larger network 33, as is common with separate carriers performing interconnects between their respective networks. FIG. 3c illustrates a network 30 with external nodes running an application 34 connecting to edge nodes 32, which is common when external nodes attach to a network.

Referring to FIG. 3a, the network 30 includes core nodes 31 and edge nodes 32. The network 30 can include any telecommunications devices for nodes, such as optical network elements (e.g. dense wavelength division multiplexing (DWDM) elements), SONET network elements (e.g. OC-48, OC-192 elements, etc.), and data network elements (e.g. routers, switches, etc.). Traditionally, the nodes 31,32 are provisioned and operated through an EMS that connects to one or more of the nodes 31,32. In accordance with the present invention, the nodes 31,32 are configured to accept SIP to access network resources.

The nodes 31,32 are equipped with SIP Client and/or Proxy entities that can receive and generate SIP messages to support session establishment independent of the network technology. The SIP Client and/or Proxy entities can be hosted directly on the central processor units of the nodes 31,32, or may be hosted by an attached processor. In a typical case, a node 31 receives a SIP INVITE from an application residing on a network application server, which contains session information such as the session destination and session characteristics (e.g., bandwidth, application, coding format, etc.). It processes this to determine the specific requirements to support the session in the particular network technology (e.g., optical, SONET/SDH, packet, etc.) supported by the network 30, and arranges for the necessary allocation of resources in its network. It also forwards the SIP INVITE to the next SIP Proxy as determined by a DNS lookup table or other mechanism, which could also be the destination SIP Client.

One of the edge nodes 32 receives a SIP INVITE from a high-bandwidth SIP Client residing outside of its local network domain, again containing session information that it processes to determine the specific requirements for the network technology in the network 30, and arranges for allocation of resources in its network, and forwards the SIP INVITE to the next SIP Proxy. A variety of mechanisms can be used for resource allocation within the network 30, including local technology-specific protocols used between network nodes, and local EMS, if this is used for resource control. For SONET/SDH, for example, an edge node 32 might determine from the SIP INVITE where the supporting egress node is for the session, and compute a SONET/SDH path to that egress node based on the bandwidth and class of service requirements associated with the application type, bandwidth requirements, and codec indicated in the SIP INVITE. The SONET/SDH path might then be created by using the internal control plane signaling in the network 30, such as sending a PNNI SETUP message if OSRP is used within the network 30.

Referring to FIG. 3b, the network 33 actually includes two networks 30-1, 30-2, such as those depicted in FIG. 3a, forming a larger network. In the network 33, nodes 31,32 from each of the smaller networks 30-1, 30-2 are operable to communicate with one another. This illustrates an example where two carriers meet and interconnect their nodes 31,32. In accordance with the present invention, the nodes 31,32 from both networks 30-1, 30-2 are configured to accept SIP to access network resources. This provides an ability to provision and operate the nodes 31,32 on separate platforms.

The nodes 31,32 in the networks 30-1, 30-2 communicate session service requirements using SIP to establish a session crossing both networks 30-1, 30-2. Since SIP conveys the service requirements and is technology independent, an edge node 32 in network 30-1 can derive the requirements for supporting the session in the network's technology, while an edge node 32 in network 30-2 can also derive the requirements for supporting the session in the network's technology. Supporting the allocation of resources then can be done independently in each network.

For example, if one network 30-1 is a SONET/SDH network using an internal control plane, such as OSRP, then resources are allocated by sending a PNNI SETUP message requesting SONET/SDH timeslot allocation with an associated class of service in order to set up a SONET/SDH path from the ingress node to the egress node. If another network 30-2 is, on the other hand, a photonic network using an EMS to control the network, then resources are allocated by having an edge node 32 receive the SIP INVITE, determine photonic requirements such as wavelengths required, length of path allowed, etc., either using local path computation or using the assistance of an EMS, and then communicate with the EMS in order to create the necessary path across the network. The EMS then communicates with core nodes 31 and an edge node 32 for the network 30-2 in order to create a supporting path across the network for the session.

Referring to FIG. 3c, there is an application 34, such as that residing in a database in an enterprise, and a network 30, such as that provided by a carrier, or such as a private network. The application 34 is able to use SIP to access network resources. Typically, an application uses SIP to create a session with another application, for example, a telephone call between two telephones. In this case, however, the application 34 generates a request which is in the SIP format. The request can be a manually-configured request that triggers an event, or it can be it an automated request, such as that provided by a computer program. This request allows the application 34 to obtain network resources. For example, a database needs to perform a backup and requests new and, in this example, temporary bandwidth from the network 30. Advantageously, the request is directed to the network 30, and not to the destination, this being an important distinction from conventional methods and systems and from the way SIP was designed to work. The request can contain a plurality of parameters, and can even include capability exchange to a network broker, similar to that contained in an SDP message. The request can involve items such as wavelength, bandwidth, and even higher-layer concepts, such as Ethernet or IP parameters. The request can allow the network 30 to avoid the requirement that all OSI layers are supported in the network, this also being an important and separate distinction.

This capability allows abstraction of subnetworks within the network 30. For example, consider a request from an enterprise database to a network. Consider the first network span to be a layer 0-only capable network. The SIP request is routed to the controller that sets up a layer 0 optical path across this span. The next hop is to an Ethernet capable network, which also has layer 0 capability. The SIP request is handed off to the controller for that subnetwork that sets up appropriate parameters in that piece of the network (be it done as provisioned or signaled in that network). This SIP request is compatible with the first hop, e.g., perhaps the optical wavelength has to be the same, and this is ensured by either the serialization of the SIP request process, or by a controller overseeing all hops, or by a combination of both. The abstraction of the capabilities of each subnetwork can result in some pieces being able to route at layer 3, some being able to switch at layer 2 or 1 or 0, but the important fact is that the service appears to be at all required layers from the requestor's point of view. This is applicable to any combination of capabilities and subnetworks in any order as happens to be installed. The SIP requests are routed (sent) to appropriate controllers which can themselves be in a hierarchical or serial or single node architecture.

The network 30 can even be multiple carrier networks, where the SIP request is used as universal intercarrier resource request. This is illustrated in FIG. 3b. This, in fact, fits directly into an IMS network. An IMS or similar network is compatible with this mechanism, and brings certain advantages even though these advantages can be brought to bear without a true IMS solution. For example, some of the main benefits of IMS are to authenticate the source SIP request in order to authenticate the requester, to determine what the requestor is allowed to obtain as services, and to bill appropriately, even intercarrier. With respect to IMS, the present invention provides a SIP-enabled network resource request that is a new way of using the SIP—to the network or within the network to itself (intranodal requests). By generating appropriate SIP requests, an IMS or equivalently-enabled network will extract the SIP message to its CSCF, and trigger all required network activities including authentication (assuming the network elements have appropriately registered in the way the IMS network requires), including billing, and even the setting up of other network equipment as needed and customary in IMS.

The present invention can be applied to any network 30 which is configured to accept SIP requests. This includes, but is not limited to, optical networks (SONET, DWDM, etc.), data networks (IP, Ethernet, ATM, etc.), wireless networks, storage-area networks (SANs), cable networks, and enterprise networks, among others. The network 30 can include a combination of different networking technologies, but be controlled utilizing the same SIP requests. For example, a network 30 can include optical DWDM network elements with SONET OC-192 wavelengths each carrying Ethernet over SONET and users connected to the routers which in turn connect to through the SONET OC-192 wavelengths. Utilizing SIP, a single request for increased bandwidth can be given to all the network elements without requiring provisioning at each layer for each network element. Further, the present invention provides the capability to add new, emerging networking technologies utilizing the same SIP framework. For example, a wireless link or SAN could be added to the previous example above and it could request network services utilizing the same SIP framework. It is assumed that the network elements of the network 30 are each equipped with a processor operable to receive SIP commands, or are operable to receive and support corresponding software upgrades. The EMS is present in order to provision network element capabilities.

Figure 4:
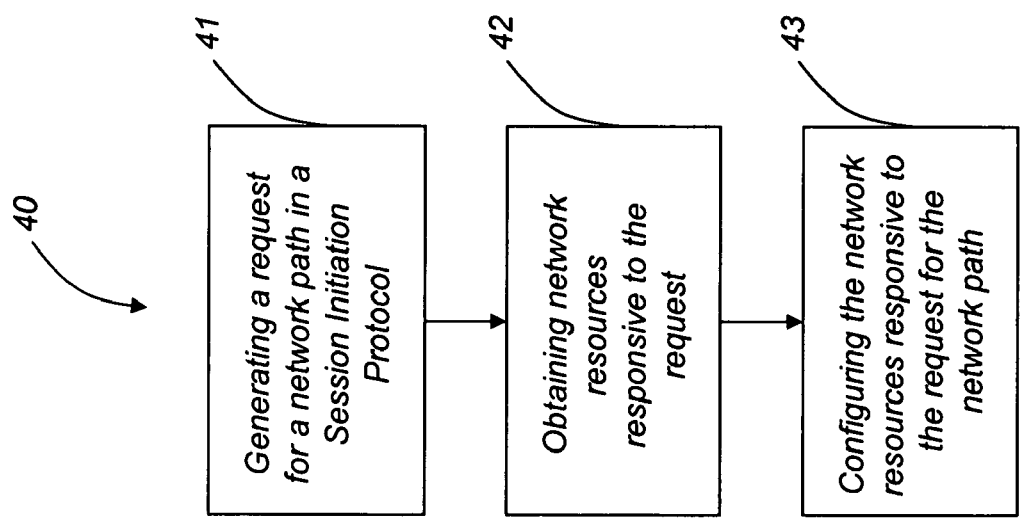
FIG. 4 is a flowchart illustrating an exemplary embodiment of the present invention, utilizing SIP to request a network path on a telecommunications network.

Referring to FIG. 4, flowchart 40 illustrates an exemplary embodiment of the present invention designed to set up a network path in a telecommunications network utilizing SIP. The telecommunications network can include an optical network (e.g. a DWDM network), a SONET network (e.g. an OC-48, OC-192 network, etc.), a data network (e.g. routers, switches, etc.), and/or combinations thereof. Particularly, the present invention provides the ability to set up a network route at layers 0 through 3 with SIP, avoiding the requirement of provisioning different layers separately. A request is generated for a network path in SIP (block 41). The request can be manually configured (e.g. via a user request for a new service) or automatically configured (e.g. via a protection switch responsive to a fault condition). The network obtains network resources responsive to the request (block 42). The SIP request is directed at the network and not at any particular node or at any particular layer on the OSI stack, and the network responds to the request to obtain the required network parameters responsive to the request. For example, in an optical network, a SIP request to add a new wavelength would obtain the available paths and wavelengths. This SIP request can be generated by a user at one of the higher OSI stack layers and directed on Ethernet. The network would receive this SIP request at the Ethernet layer and direct it at the optical layer to provide the requested resources. The network resources are configured responsive to the request for the network path (block 43). Here, the network elements in the network automatically provision based upon the request. For example in an optical network, the network elements provision the wavelength and service based upon the request.

Figure 5:
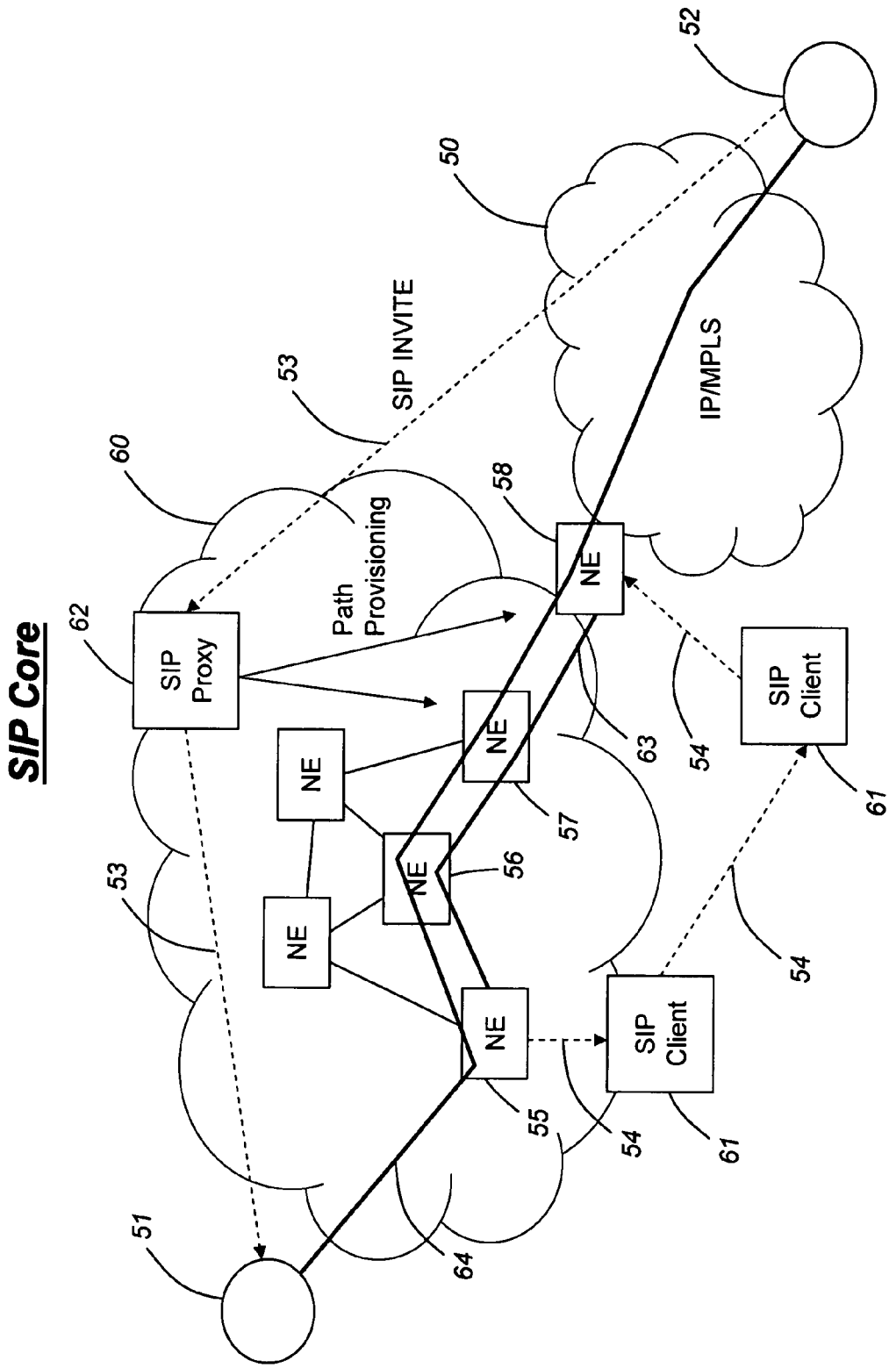
FIG. 5 is a schematic diagram illustrating an exemplary embodiment of the present invention, utilizing SIP for network control in a core network including a first and second high-bandwidth SIP client connected through an IP/MPLS network and the core network.

Referring to FIG. 5, an exemplary embodiment of the present invention utilizing SIP for network control in a core network includes a first and second high-bandwidth SIP client 51,52 connected through an IP/MPLS network 50 and a core network 60. The SIP client 52 connects to the IP/MPLS network 50. A network element (NE) 58 operates as a gateway connecting the IP/MPLS network 50 to the core network 60. The IP/MPLS network 50 can include an Ethernet network, such as a gigabit Ethernet network, and it can interconnect to the network element 58 at gigabit Ethernet. The core network 60 includes network elements 55,56,57,58, which can include, for example, SONET multiplexers or data routers.

In the example illustrated in FIG. 5, the SIP client 52 is operable for sending a SIP INVITE message 53 to a SIP proxy 62, which in turn is sent to the SIP client 51. The SIP INVITE can provide a request for bandwidth on demand, or for a virtual private network service. As illustrated in FIG. 5, the SIP client 52 requests bandwidth 64 between itself and the SIP client 51. The SIP INVITE message 53 is sent to the SIP proxy 62, which in turn provisions the path on the network elements 55,56,57,58 to set up the bandwidth 64 between the SIP clients 51,52. This provides an alternative to a technology-specific network interface to provision bandwidth across layers 0 through 3.

In a second example illustrated in FIG. 5, a first network element 55 sends a SIP INVITE message 54 to a SIP client 61 for bandwidth to a second network element 58. The SIP client 61 relays the SIP INVITE message 54 to another SIP client 61, which in turn provides the SIP INVITE message 54 to the second network element 58. The SIP INVITE message 54 is only sent to the session endpoints at the network elements 55,58. In turn, the core network 60 provisions a path based on the SIP INVITE message 54 and bandwidth 63 is provided between the network elements 55,58. For example, this can include provisioning optical bandwidth through a new wavelength, SONET bandwidth by allocating STS-1s, and Ethernet bandwidth. A single SIP INVITE message 54 is operable to provision at all of these layers.

Figure 6:
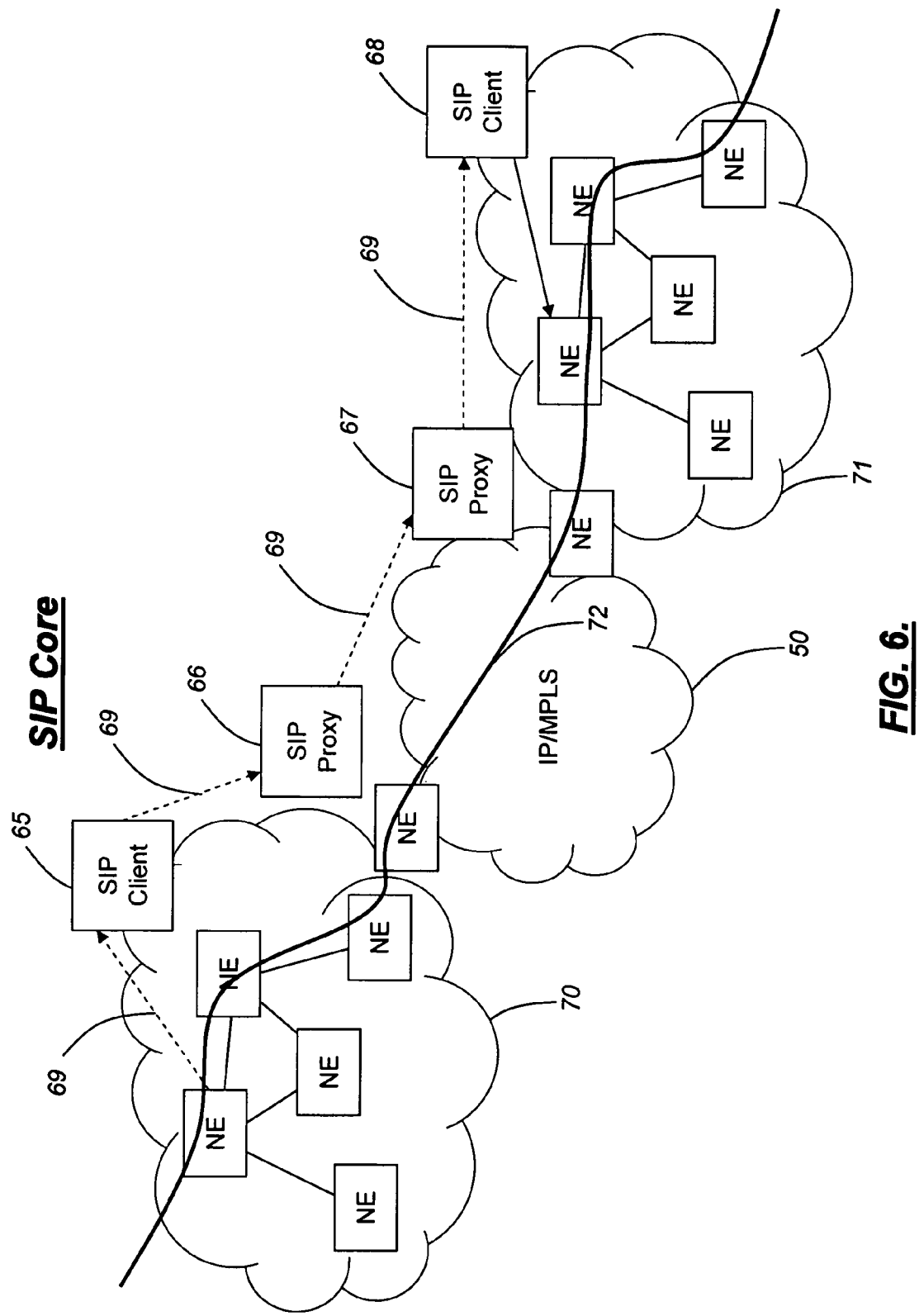
FIG. 6 is a schematic diagram illustrating another exemplary embodiment of the present invention, utilizing SIP for network control in a core network including a first core network, an IP/MPLS network, and a second core network with the first and second core networks connected through the IP/MPLS network.

Referring to FIG. 6, in another exemplary embodiment of the present invention utilizing SIP for network control, a core network includes a first core network 70, an IP/MPLS network 50, and a second core network 71, with the first and second networks 70,71 connected through the IP/MPLS network 50. A SIP INITIATE message 69 is initiated from one of the network elements in the first network 70 to a SIP client 65 requesting bandwidth through the first and second networks 70,71 and the IP/MPLS network 50. The SIP client 65 relays the SIP INITIATE message 69 to a SIP proxy 66, which relays it to another SIP proxy 67, which in turn relays it to a second SIP client 68. The first SIP client 65 provisions a path through the first network 70 and the second SIP client 68 provisions a path through the second network 71. Accordingly, bandwidth 72 is provisioned between the networks 70,71 and the IP/MPLS network 50 with a single SIP INITIATE message 69. Here, SIP provides a technology-independent call-control interface, and the SIP proxy functions to relay connections across network borders.

Figure 7:
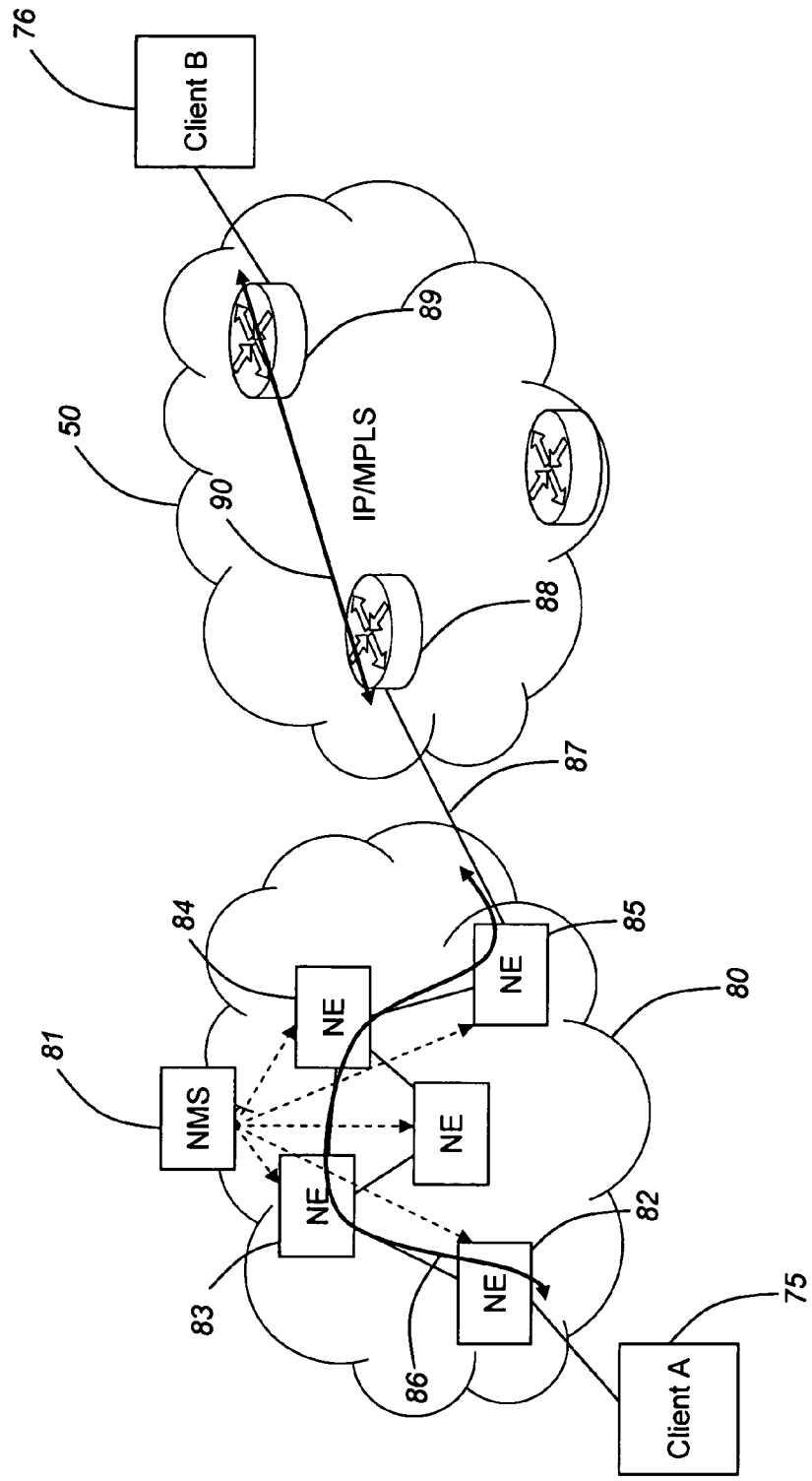
FIG. 7 is a schematic diagram illustrating a further exemplary embodiment of the present invention, utilizing SIP for network control via SIP interworking with IP/MPLS.

Referring to FIG. 7, a further exemplary embodiment of the present invention utilizing SIP for network control, illustrating SIP interworking with IP/MPLS, includes a network 80, an IP/MPLS network 50, a client A 75, and a client B 76 connected to both the network 80 and the IP/MPLS network 50. The network 80 includes several network elements 82,83, 84,85, which can include, but are not limited to, SONET multiplexers or data routers. In the example of FIG. 7, a first network element 82 is configured with an Ethernet port operable to connect to client A 75 and this port can be configured through a NMS 81 for a path 86 through the network 80 through the network elements 82,83,84,85. Further, the port connected to client A 75 can be configured utilizing SIP. The port connected to client A 75 is operable to connect to the IP/MPLS network 50 through a connection 87 from another network element 85.

In a first example, network 80 connects to the IP/MPLS network 50 with an Ethernet connection 87 which can include a 10BaseT, 100BaseT, or gigabit Ethernet port, optionally with a virtual local area network (VLAN). This example is likely when the network 80 is connected to a carrier's existing IP/MPLS network 50. The path 86 is created across the network 80 to the egress network element 85. With regards to the IP/MPLS network 50, core routers 88,89 at each end on the IP/MPLS network 50 are manually provisioned with a label and port/VLAN. These core routers 88,89 are given each other's IP address and LDP or RSVP is used to create an LSP. Once provisioned, traffic will flow from client A 75 to client B 76. Here, SIP is used between the network elements 82,83, 84,85 of network 80 as a call-level signaling indicating the Ethernet service characteristics through the network 80. Optionally, SIP can be used on the IP/MPLS network 50 and the routers 88,89.

In a second example, network 80 connects directly to the IP/MPLS network 50 with a connection 87 supporting PWE3 encapsulation. Here, the connection 87 between the network 80 and the IP/MPLS network 50 can include a network element interfacing directly to the router 87. Here, the SIP hand-off at the connection 87 allows auto-provisioning of the Ethernet service across both the network 80 and the IP/MPLS network 50. The SIP request is free from network specifics. In this case, an IP/MPLS network cannot carry native format of the data, for example it is TDM, so the data is carried across a TDM network as TDM, or across an IP/MPLS network using PWE3 for that section. SIP is the request and the network figures out how to provide the necessary resources to carry the data.

Figure 8:
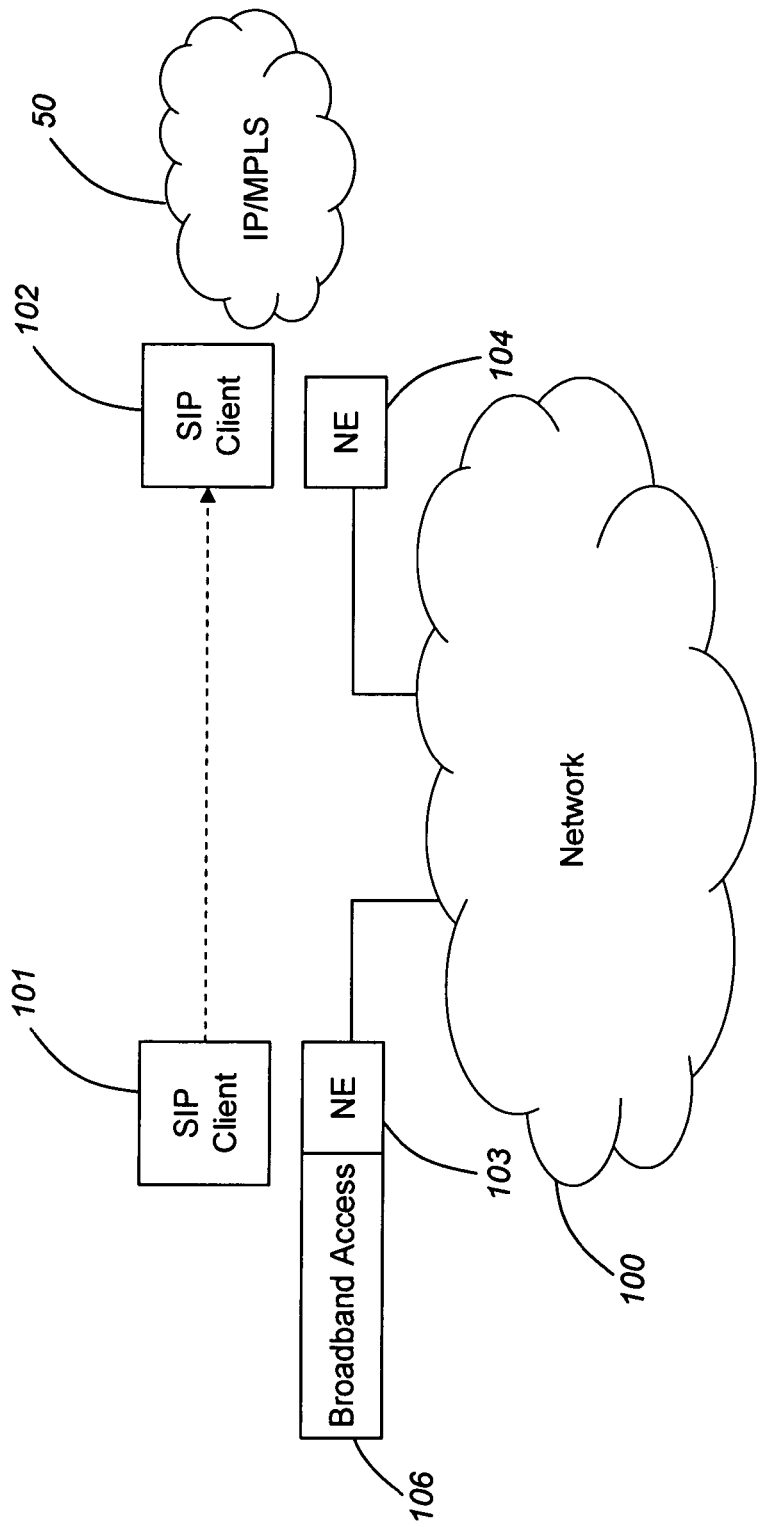
FIG. 8 is a schematic diagram illustrating a still further exemplary embodiment of the present invention, utilizing SIP for network control via SIP use in an access network.

Referring to FIG. 8, a still further exemplary embodiment of the present invention utilizing SIP for network control, illustrating SIP in an access network, includes a network 100 of the same family of network elements connected together in an access network, and to broadband access 106 devices connected to a network element 103. The network 100 additionally includes SIP clients 101,102 to provide a technology-independent call or session control function. SIP specifies the session characteristics to be supported by the transport connection through the network 100. The SIP clients 101,102 are connected to each other through the IP/MPLS network 50 and are configured to accept and relay SIP messages. For example, the SIP client 101 can send a SIP INVITE message to SIP client 102 requesting bandwidth between the broadband access device 106 and the IP/MPLS network 50. This message is received by the network 100, which provisions bandwidth services on the network elements 103,104 and provisions a path through the network 100 between the first network element 103 and the second network element 104.

Figure 9:
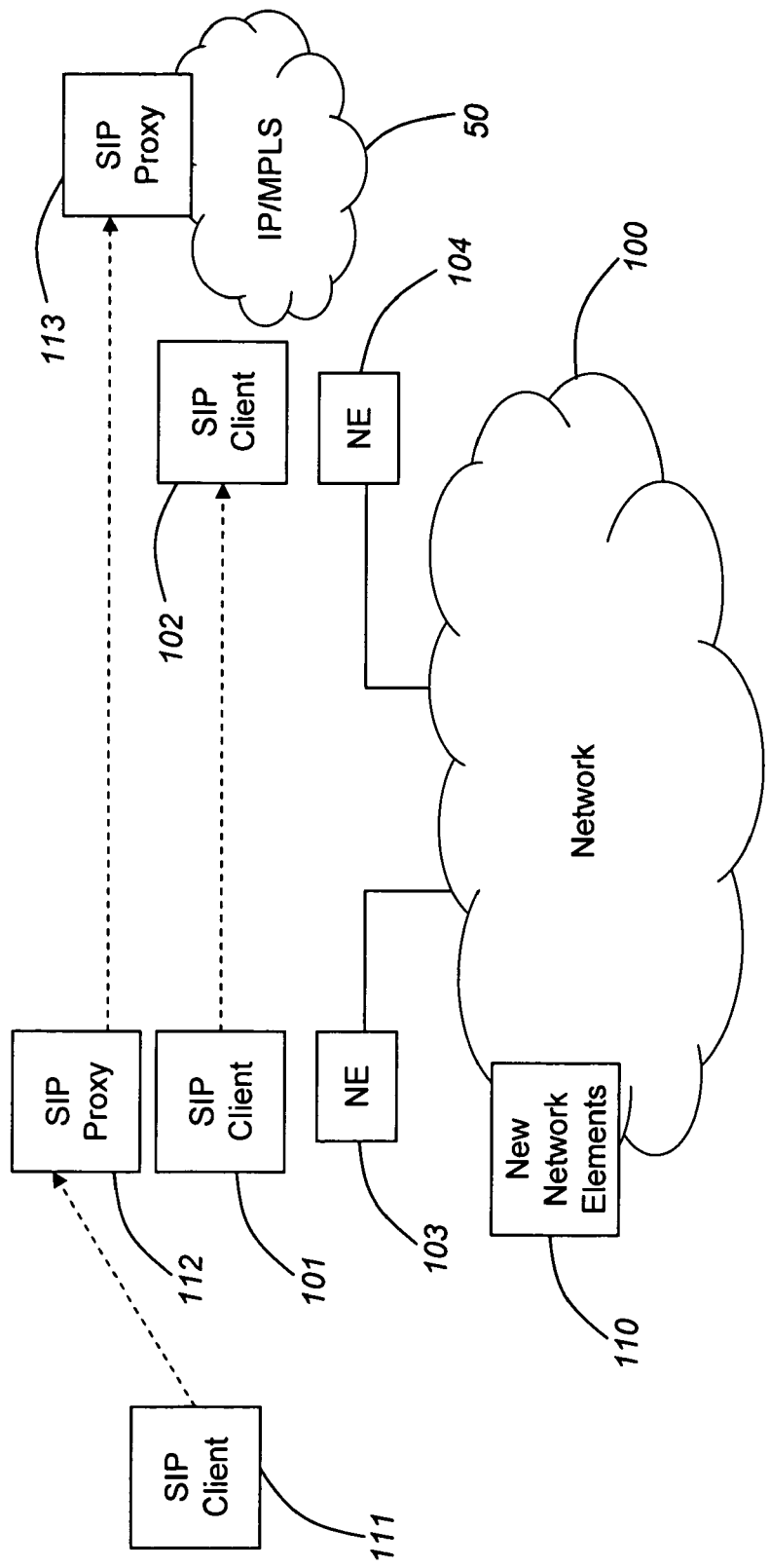
FIG. 9 is a schematic diagram illustrating a still further exemplary embodiment of the present invention, utilizing SIP for network control via SIP use in an access network.

Referring to FIG. 9, a still further exemplary embodiment of the present invention utilizing SIP for network control, illustrating SIP in an access network, includes a network 100 of the same family of network elements connected together in an access network, connected to new network elements 110, and to broadband access network elements 103,104. Here, SIP clients 101,102 operate as depicted in FIG. 8 to specify the session characteristics to be supported by the transport connection through the network 100. Additionally, FIG. 9 illustrates two SIP proxies 112,113 connected to a SIP client 111 and the IP/MPLS network 50, respectively. The SIP proxy 112 terminates the SIP client 111 and provides traditional SIP functions, such as call routing, call forwarding, and other call features. The SIP clients 101,102,111 connected to the SIP proxies 112,113 are operable to provision bandwidth as needed in the network 100. Further, new network elements 110 are capable of being added to the network and interworking with the SIP clients 101,102,111 for control and operation.

SIP can also be used as a communication channel on the SIP infrastructure, equivalent to E1/E2-bytes in SONET or equivalent in SDH overhead. Similarly other SONET bytes can be emulated as needed. In general terms, since SIP is a method to connect users or processes together, it can also be used to provide other services such as those previously done with the overhead bytes in SONET. One particular example is the voiceband connection over the SONET orderwire, which is a classical SIP+VoIP application.

Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A network method utilizing Session Initiation Protocol (SIP) to establish a network path between network elements in a network, the network method comprising:

generating a request for a network service at layer 1, layer 2, layer 3, and combinations thereof in Session Initiation Protocol, wherein the request is one of manually and automatically configured, and wherein the request is directed to the network through a SIP message with an associated payload and authentication, the SIP message directed to a SIP Client or SIP Proxy associated with the network and equipped on an optical network element, wherein the network comprises connected network elements;

obtaining network resources responsive to the SIP message, wherein the network resources comprise network parameters required to obtain and provision a network path at layer 1, layer 2, layer 3, and combinations thereof; and configuring the network resources responsive to the SIP message, wherein configuring the network resources comprises modifying a setting of at least one optical network element of the network, the setting associated with layer 1 operation comprising a combination of wavelength division multiplexing and time division multiplexing operation, layer 2 operation, and combinations thereof of the optical network element, wherein the configuring the network resources through the SIP message comprises any of setting up a new wavelength and allocating new synchronous optical network bandwidth via synchronous transport signal-1 (STS-1s), and wherein the network resources are configured by the SIP message at each of layer 1, layer 2, layer 3, and combinations thereof through the network elements without requiring provisioning at each of layer 1, layer 2, layer 3, and combinations thereof for each network element;

wherein the plurality of network elements comprise a plurality of optical network elements, and wherein the network path comprises wavelengths between first and second optical network elements in the network, and wherein the network parameters comprise one or more of available wavelengths, available bandwidth, available regeneration points, available circuits, intermediate network elements, and a combination thereof, and wherein the wavelengths are switched responsive to the request.

2. The network method of claim 1, wherein the network comprises a plurality of network elements operable to receive Session Initiation Protocol requests.

3. The network method of claim 1, wherein the network comprises one of a telecommunications network, a cable network, an enterprise network, a wireless network, and a combination thereof.

4. A network utilizing Session Initiation Protocol (SIP) to establish network paths between network elements in the network, the network comprising:

a plurality of connected optical network elements operable to receive Session Initiation Protocol requests directed to the network through a SIP message with an associated payload and authentication, the SIP message directed to a SIP Client or SIP Proxy associated with the network and equipped on an optical network element; and a Session Initiation Protocol server connected to one or more of the plurality of network elements;

wherein the Session Initiation Protocol requests comprise requests for network resources at each of layer 1, layer 2, and layer 3, to establish a network path between two network elements, the network path comprising layer 1 resources comprising a combination of wavelength division multiplexing and time division multiplexing systems that are part of the Session Initiation Protocol requests;

wherein the network is operable to configure the network resources responsive to the Session Initiation Protocol requests, and wherein the configuring the network resources through the SIP message comprises any of setting up a new wavelength and allocating new synchronous optical network bandwidth via synchronous transport signal-1 (STS-1s); and wherein the network resources are configured by the request at each of layer 1, layer 2, layer 3, and combinations thereof through the optical network elements without requiring provisioning at each of layer 1, layer 2, layer 3, and combinations thereof for each optical network element;

wherein the network path comprises wavelengths between first and second optical network elements in the network, and wherein the network parameters comprise one or more of available wavelengths, available bandwidth, available regeneration points, available circuits, intermediate network elements, and a combination thereof, and wherein the wavelengths are switched responsive to the request.

5. The network of claim 4, wherein the network comprises an optical dense wavelength division multiplexed network.

6. The network of claim 4, wherein the network comprises one or more of a telecommunications network, a cable network, an enterprise network, a wireless network, and a combination thereof.

7. A network utilizing Session Initiation Protocol (SIP) to control network resources, the network comprising:

a Session Initiation Protocol application; and one or more nodes, wherein the one or more nodes are connected to the application;

wherein the application is operable to generate network requests for network resources at layer 1, layer 2, and combinations thereof in Session Initiation Protocol, wherein the requests are directed to the network through a SIP message with an associated payload and authentication, the SIP message directed to a SIP Client or SIP Proxy associated with the network and equipped on an optical network element;

wherein the network comprises connected network elements and is operable to control the network resources responsive to the SIP message;

wherein the one or more nodes are configured to compute a synchronous optical network or synchronous digital hierarchy network path through the network based on bandwidth and class of service requirements responsive to the SIP message, and wherein the computation is performed utilizing an internal control plane associated with the one or more nodes; and wherein the network resources are configured by the SIP message at each of layer 1 comprising a combination of wavelength division multiplexing and time division multiplexing, layer 2, and combinations thereof through the one or more nodes without requiring provisioning at each of layer 1, layer 2, and combinations thereof for each node;

wherein the connected network elements comprise a plurality of optical network elements, and wherein the network path comprises wavelengths between first and second optical network elements in the network, and wherein the network parameters comprise one or more of available wavelengths, available bandwidth, available regeneration points, available circuits, intermediate network elements, and a combination thereof, and wherein the wavelengths are switched responsive to the request.

8. The network of claim 7, wherein the application resides on a database.

9. The network of claim 7, wherein the network request is for bandwidth on the network, and the one or more nodes are configured to modify layer 1 connections based on the network request.

10. The network of claim 7, wherein the network request is directed to the one or more nodes connected to the application.

11. The network of claim 7, wherein the network request comprises a plurality of parameters, and wherein the plurality of parameters comprise a plurality of Open Systems Interconnection layer parameters operable to control network resources.

12. The network of claim 7, wherein the network comprises one or more of a telecommunications network, a cable network, an enterprise network, a wireless network, and a combination thereof.

13. A network utilizing Session Initiation Protocol (SIP) to control a plurality of Open Systems Interconnection layer resources in order to eliminate dependencies on the network being homogeneous, the network comprising:
  a Session Initiation Protocol application, wherein the application resides on a database; and
  one or more nodes with multiple Open Systems Interconnection layer resources, wherein the one or more nodes are connected to the database;
  wherein the application is operable to generate network requests in Session Initiation Protocol for network resources across a plurality of Open Systems Interconnection layers, wherein the network requests are directed to the network through a SIP message with an associated payload and authentication, the SIP message directed to a SIP Client or SIP Proxy associated with the network and equipped on an optical network element, and wherein the SIP message is operable to be received at any one of the plurality of Open Systems Interconnection layers for network resources at layer 1, layer 2, layer 3, and combinations thereof, wherein at least one of the network requests comprises a request for network resources through the SIP message comprising a combination of wavelength division multiplexing and time division multiplexing operation;
  wherein the network comprises connected network elements and is operable to control and switch network resources across the plurality of Open Systems Interconnection layers responsive to the network requests through the SIP message, and wherein the network requests comprise modification of the network resources at layer 1 comprising switching of wavelengths;
  wherein the one or more nodes are configured to compute a synchronous optical network or synchronous digital hierarchy network path through the network based on bandwidth and class of service requirements responsive to the network requests, and wherein the computation is performed utilizing an internal control plane associated with the one or more nodes; and
  wherein the network resources are configured by the network requests through the SIP message at each of layer 1, layer 2, layer 3, and combinations thereof through the network elements without requiring provisioning at each of layer 1, layer 2, layer 3, and combinations thereof for each network element;
  wherein the connected network elements comprise a plurality of optical network elements, and wherein the network path comprises wavelengths between first and second optical network elements in the network, and wherein the network parameters comprise one or more of available wavelengths, available bandwidth, available regeneration points, available circuits, intermediate network elements, and a combination thereof, and wherein the wavelengths are switched responsive to the request.

14. The network of claim 13, wherein the application separates control and switching.

15. The network of claim 14, wherein a layer 0 comprises one or more of an optical network, a wireless network, an optical transport network, a cable network, and a combination thereof.

16. The network of claim 14, wherein a layer 1 comprises one or more of a synchronous optical network, a synchronous digital hierarchy network, an optical transport network, and a plesiochronous network.

17. The network of claim 14, wherein a layer 2 and a layer 3 comprise one or more of an Ethernet network, an Internet Protocol network, an Ethernet datapath network, an Internet Protocol-controlled network, and a combination thereof.

18. A network utilizing Session Initiation Protocol and Internet Protocol Multimedia Subsystem to control network resources in order to eliminate dependencies on the network being homogeneous, the network comprising:
  a Home Subscriber Server operable to handle Session Initiation Protocol calls/sessions, wherein the Home Subscriber Server is a database;
  Session Initiation Protocol servers or proxies, collectively referred to as the Call Session Control Function, used to process Session Initiation Protocol signaling packets in the Internet Protocol Multimedia Subsystem, wherein the Session Initiation Protocol servers or proxies are connected to the Home Subscriber Server; and
  one or more nodes, wherein the one or more nodes are connected to the Session Initiation Protocol servers or proxies, and wherein the one or more nodes are interconnected at layer 1 and layer 2;
  wherein the one or more nodes are operable to register with the Home Subscriber Server;
  wherein the Session Initiation Protocol servers or proxies are operable to generate network requests in Session Initiation Protocol for network resources at layer 1, layer 2, and combinations thereof and the network requests are authenticated by the Home Subscriber Server, wherein the network requests are directed to the network through a SIP message with an associated payload and authentication, the SIP message directed to a SIP Client or SIP Proxy associated with the network and equipped on an optical network element, wherein at least one of the network requests comprises a request for network resources comprising a combination of wavelength division multiplexing and time division multiplexing operation;
  wherein the network comprises connected network elements and is operable to control network resources at layer 1 and layer 2 responsive to the SIP message, wherein to control network resources comprises switching wavelengths at layer 1, wherein to control network resources at layer 1 and layer 2 comprises any of setting up a new wavelength and allocating new synchronous optical network bandwidth via synchronous transport signal-1 (STS-1s) in response to the SIP message, and wherein the one or more nodes are configured to compute a synchronous optical network or synchronous digital hierarchy network path through the network based on bandwidth and class of service requirements responsive to the SIP message, and wherein the computation is performed utilizing an internal control plane associated with the one or more nodes; and
  wherein the network resources are configured by the network requests at each of layer 1, layer 2, and combinations thereof through the network elements without requiring provisioning at each of layer 1, layer 2, and combinations thereof for each network element;

wherein the connected network elements comprise a plurality of optical network elements, and wherein the network path comprises wavelengths between first and second optical network elements in the network, and wherein the network parameters comprise one or more of available wavelengths, available bandwidth, available regeneration points, available circuits, intermediate network elements, and a combination thereof, and wherein the wavelengths are switched responsive to the request.

19. The network of claim 18, wherein the network comprises one or more of an optical network, a telecommunications network, a cable network, an enterprise network, a wireless network, and a combination thereof.

20. The network of claim 18, wherein the Home Subscriber Server comprises user profiles, authentication and authorization information, and physical network information.

21. The network of claim 18, wherein the network comprises a plurality of Open Systems Interconnection layers and wherein the network request is operable to be received at an Open System Interconnection layer for requesting network resources at any of the Open System Interconnection layers.

* * * * *